US012578195B2

(12) United States Patent　　(10) Patent No.:　US 12,578,195 B2
Kikkawa et al.　　　　　　　　(45) Date of Patent:　　Mar. 17, 2026

(54) INFORMATION PROCESSING SYSTEM AND INFORMATION PROCESSING METHOD

(71) Applicant: SONY GROUP CORPORATION, Tokyo (JP)

(72) Inventors: Norifumi Kikkawa, Tokyo (JP); Daisuke Fukunaga, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 389 days.

(21) Appl. No.: 18/004,395

(22) PCT Filed: Jun. 7, 2021

(86) PCT No.: PCT/JP2021/021522

§ 371 (c)(1),
(2) Date: Jan. 5, 2023

(87) PCT Pub. No.: WO2022/014200

PCT Pub. Date: Jan. 20, 2022

(65) Prior Publication Data

US 2023/0280164 A1　　Sep. 7, 2023

(30) Foreign Application Priority Data

Jul. 15, 2020　　(JP) ................................. 2020-121176

(51) Int. Cl.
*G01C 21/20*　　　(2006.01)
*G05D 1/00*　　　(2024.01)

(52) U.S. Cl.
CPC ......... *G01C 21/206* (2013.01); *G05D 1/0214* (2013.01)

(58) Field of Classification Search
CPC .... G01C 21/206; G01C 21/20; G01C 21/383; G05D 1/0214; G05D 1/0274; G05D 1/0297
See application file for complete search history.

(56) References Cited

U.S. PATENT DOCUMENTS

2009/0125160 A1　5/2009　Desai
2009/0182464 A1*　7/2009　Myeong ............... G05D 1/0274
　　　　　　　　　　　　　　　　　　701/25

(Continued)

FOREIGN PATENT DOCUMENTS

CN　　　101480795 A　　7/2009
CN　　　103863365 A　　6/2014

(Continued)

OTHER PUBLICATIONS

International Search Report and Written Opinion of PCT Application No. PCT/JP2021/021522, issued on Jul. 20, 2021, 08 pages of ISRWO.

*Primary Examiner* — Anne Marie Antonucci
*Assistant Examiner* — Jewel A Kuntz
(74) *Attorney, Agent, or Firm* — CHIP LAW GROUP

(57)　　　ABSTRACT

In an environment in which obstacles are present, a route map generation unit 33 sets a boundary line formed by a group of points having an equal distance from the obstacles between the obstacles in a movable region that is a region in which a mobile body is movable, determines the number of lanes for a boundary line in accordance with a distance from each of the obstacles and a size of the mobile body moving between the obstacles, and generates a route map having number-of-lanes information. Furthermore, the route map generation unit 33 updates the route map according to a change of the movable region. A route planning unit 37 plans a route for each mobile body such that the number of mobile bodies does not exceed the number of lanes indicated by the number-of-lanes information on the basis of the route map. A mobile body 20 executes a movement task on the basis of a route plan generated by the route planning unit 37. A plurality of the mobile bodies can be efficiently operated (Continued)

10 even in an environment in which a passable region of the mobile body changes.

18 Claims, 12 Drawing Sheets

(56)                References Cited

U.S. PATENT DOCUMENTS

| | | | | |
|---|---|---|---|---|
| 2009/0210151 | A1 * | 8/2009 | Toyoda | G08G 1/09685 |
| | | | | 701/532 |
| 2013/0238240 | A1 * | 9/2013 | Tamai | G01C 21/34 |
| | | | | 701/527 |
| 2016/0042236 | A1 * | 2/2016 | Ishimaru | G06T 7/12 |
| | | | | 382/104 |
| 2017/0305420 | A1 | 10/2017 | Desens | |
| 2019/0286766 | A1 * | 9/2019 | Yoshida | G08G 1/00 |
| 2020/0386567 | A1 * | 12/2020 | Igarashi | G01C 21/3815 |

FOREIGN PATENT DOCUMENTS

| | | | | | |
|---|---|---|---|---|---|
| CN | 107037812 | A | | 8/2017 | |
| CN | 110060470 | A | | 7/2019 | |
| CN | 110554688 | A | | 12/2019 | |
| CN | 110619134 | A | | 12/2019 | |
| JP | 2008128938 | A | * | 6/2008 | |
| JP | 5332809 | B2 | * | 11/2013 | |
| JP | 2017-010110 | A | | 1/2017 | |
| JP | 2019156249 | A | * | 9/2019 | |
| JP | 2020-004342 | A | | 1/2020 | |
| KR | 20170040620 | A | * | 4/2017 | G01C 21/20 |
| WO | 2009/102970 | A2 | | 8/2009 | |

* cited by examiner

{ ———— : BOUNDARY LINE (NUMBER OF LANES 1)

———— : BOUNDARY LINE (NUMBER OF LANES 2)

O : NODE
— : EDGE

● : NODE (NUMBER OF LANES 1)
○ : NODE (NUMBER OF LANES 2)
—— : EDGE (NUMBER OF LANES 1)
━━ : EDGE (NUMBER OF LANES 2)

● : NODE (NUMBER OF LANES 1)
○ : NODE (NUMBER OF LANES 2)
— : EDGE (NUMBER OF LANES 1)
━ : EDGE (NUMBER OF LANES 2)

● : WP (NUMBER OF LANES 1)
— : EDGE (NUMBER OF LANES 1)

● : WP (NUMBER OF LANES 1)

——— : EDGE (NUMBER OF LANES 1)

INFORMATION PROCESSING SYSTEM AND INFORMATION PROCESSING METHOD

CROSS REFERENCE TO RELATED APPLICATIONS

This application is a U.S. National Phase of International Patent Application No. PCT/JP2021/021522 filed on Jun. 7, 2021, which claims priority benefit of Japanese Patent Application No. JP 2020-121176 filed in the Japan Patent Office on Jul. 15, 2020. Each of the above-referenced applications is hereby incorporated herein by reference in its entirety.

TECHNICAL FIELD

This technology relates to an information processing device, an information processing method, and a program, and enables efficient operation of a mobile body even when the density of the mobile bodies is increased in an environment in which a passable region of the mobile body changes.

BACKGROUND ART

In the related art, a system using a mobile body has been used for various purposes, for example, conveyance of articles, inspection of facilities, security, and the like. In order for the mobile body to move, it is necessary to reach the destination without colliding with static and dynamic obstacles (including other mobile robots) on environment. Therefore, for example, in Patent Document 1, generation and update of a map indicating an arbitrary environment in which a plurality of robots operates and provision of data used by one or a plurality of the robots in the environment are performed by a manager.

CITATION LIST

Patent Document

Patent Document 1: WO 2009/102970 A

SUMMARY OF THE INVENTION

Problems to be Solved by the Invention

By the way, in a route map generated by an existing method, it is not possible to determine whether passing with each other is possible. Therefore, for example, in a case where another mobile body approaches from the opposite direction on a narrow straight road, or in a case where at an orthogonal narrow intersection, another mobile body suddenly comes up and simultaneously enters the intersection from the side, a situation occurs in which two mobile bodies cannot move while facing each other (also referred to as a stall).

An object of this technology is to provide an information processing device, an information processing method, and a program, which enables efficient operation of a mobile body even when the density of the mobile bodies is increased in an environment in which a passable region of the mobile body changes.

Solutions to Problems

According to a first aspect of the present technology, there is provided an information processing device including a route map generation unit configured to, in an environment in which obstacles are present, set a boundary line formed by a group of points having an equal distance from two different obstacles among the obstacles between the obstacles in a movable region that is a region in which a mobile body is movable, and determine the number of lanes for the boundary line in accordance with a distance from each of the obstacles to the boundary line and a size of the mobile body moving in the environment.

In the technology, in the environment in which obstacles are present, the route map generation unit performs, for example, Voronoi region division on the movable region that is a region in which a mobile body is movable, sets the boundary line formed by a group of points having an equal distance from the obstacle between the obstacles, determines the number of lanes for the boundary line in accordance with a distance from the obstacle and the size of the mobile body moving between the obstacles, and generates a route map having number-of-lanes information on the basis of the boundary line and the number of lanes determined for the boundary line. The number of lanes corresponds to the number of mobile bodies that can pass through at the same time, and the size of the mobile body is the maximum value of the mobile body width orthogonal to a moving direction, and may include a margin.

The route map generation unit sets nodes at a branch point and an end point of the boundary line and at a change point of the number of lanes of the boundary line, and sets new one node between the nodes instead of two nodes between which a distance is shorter than a first threshold in a case where a distance between the nodes is shorter than a first threshold. Furthermore, in a case where the distance between the nodes is greater than a second threshold greater than the first threshold, the route map generation unit newly sets a node on the boundary line between the nodes, and divides an edge between the nodes into edges via the newly set node. Moreover, in a case where a maximum separation distance between the edge between the nodes and the boundary line is greater than a separation distance threshold, the route map generation unit newly sets a node on the boundary line between the nodes and divides the edge between the nodes into edges via the newly set node. The route map generation unit sets the number of lanes determined for the boundary line as number-of-lanes information of an edge corresponding to the boundary line and sets the minimum number of lanes in the edge connected to the nodes as number-of-lanes information of the node, and generates a topological map, in which the nodes are connected by the edge and which has the number-of-lanes information, as a route map. Furthermore, the route map generation unit may provide edges corresponding to the number of lanes determined for the boundary line and set nodes at opposite ends of the edges to generate, as a route map, a lane map in which the number of lanes of the node and the edge is one. The route map generation unit updates the route map according to a change of the movable region.

Furthermore, the information processing device further includes a route planning unit that plans a route of the mobile body by using the route map having the number-of-lanes information, and the route planning unit plans a route for each mobile body such that the number of mobile bodies does not exceed the number of lanes indicated by the number-of-lanes information. Furthermore, the route map generation unit may determine the number of lanes by using a base lane width corresponding to a plurality of mobile bodies having different sizes as the size of the mobile body, and the route planning unit may plan a route by using the number of lanes having the base lane width occupied by each mobile body having a plurality of different sizes.

According to a second aspect of the present technology, there is provided an information processing method including: in an environment in which obstacles are present, setting a boundary line formed by a group of points having an equal distance from two different obstacles among the obstacles between the obstacles in a movable region that is a region in which a mobile body is movable; and determining the number of lanes for the boundary line in accordance with a distance from each of the obstacles to the boundary line and a size of the mobile body moving in the environment.

According to a third aspect of the present technology, there is provided a program causing a computer to generate a route map, the program causing the computer to execute:

a procedure of, in an environment in which obstacles are present, setting a boundary line formed by a group of points having an equal distance from two different obstacles among the obstacles between the obstacles in a movable region that is a region in which a mobile body is movable;

a procedure of determining the number of lanes for the boundary line in accordance with a distance from each of the obstacles to the boundary line and a size of the mobile body moving in the environment; and a procedure of generating a route map having number-of-lanes information on the basis of the boundary line and the number of lanes determined for the boundary line.

Note that the program of the present technology is, for example, a program that can be provided, to a general-purpose computer capable of executing various program codes, by a storage medium provided in computer-readable format, a communication medium, for example, a storage medium such as an optical disk, a magnetic disk, or a semiconductor memory, or a communication medium such as a network. By providing such a program in computer-readable format, processing corresponding to the program is implemented on the computer.

BRIEF DESCRIPTION OF DRAWINGS

FIG. 1 is a diagram illustrating a configuration of a mobile body control system.

FIG. 4 is a diagram illustrating a movable region map.

MODE FOR CARRYING OUT THE INVENTION

Figure 2:
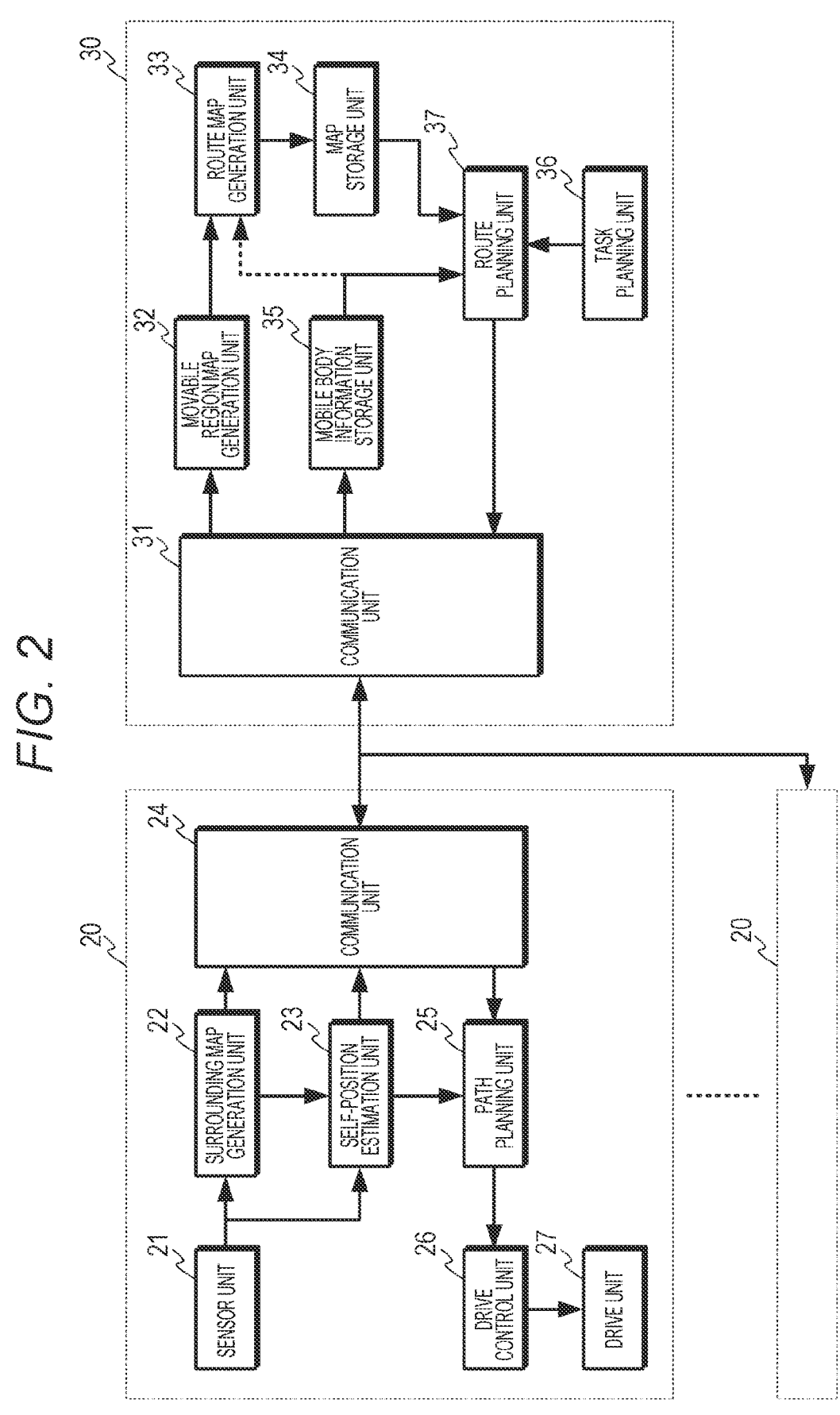
FIG. 2 is a diagram illustrating configurations of a mobile body and a server.

Hereinafter, modes for carrying out the present technology will be described. Note that the description will be given in the following order.

1. Configuration of mobile body control system
2. Configurations of mobile body and server
3. Operations of mobile body and server
3-1. Regarding generation of route map
3-2. Regarding generation of route plan
3-3. Regarding modification example of generation of route map and route plan
3-4. Regarding use of lane map
4. Application example

1. Configuration of Mobile Body Control System

Figure 1:
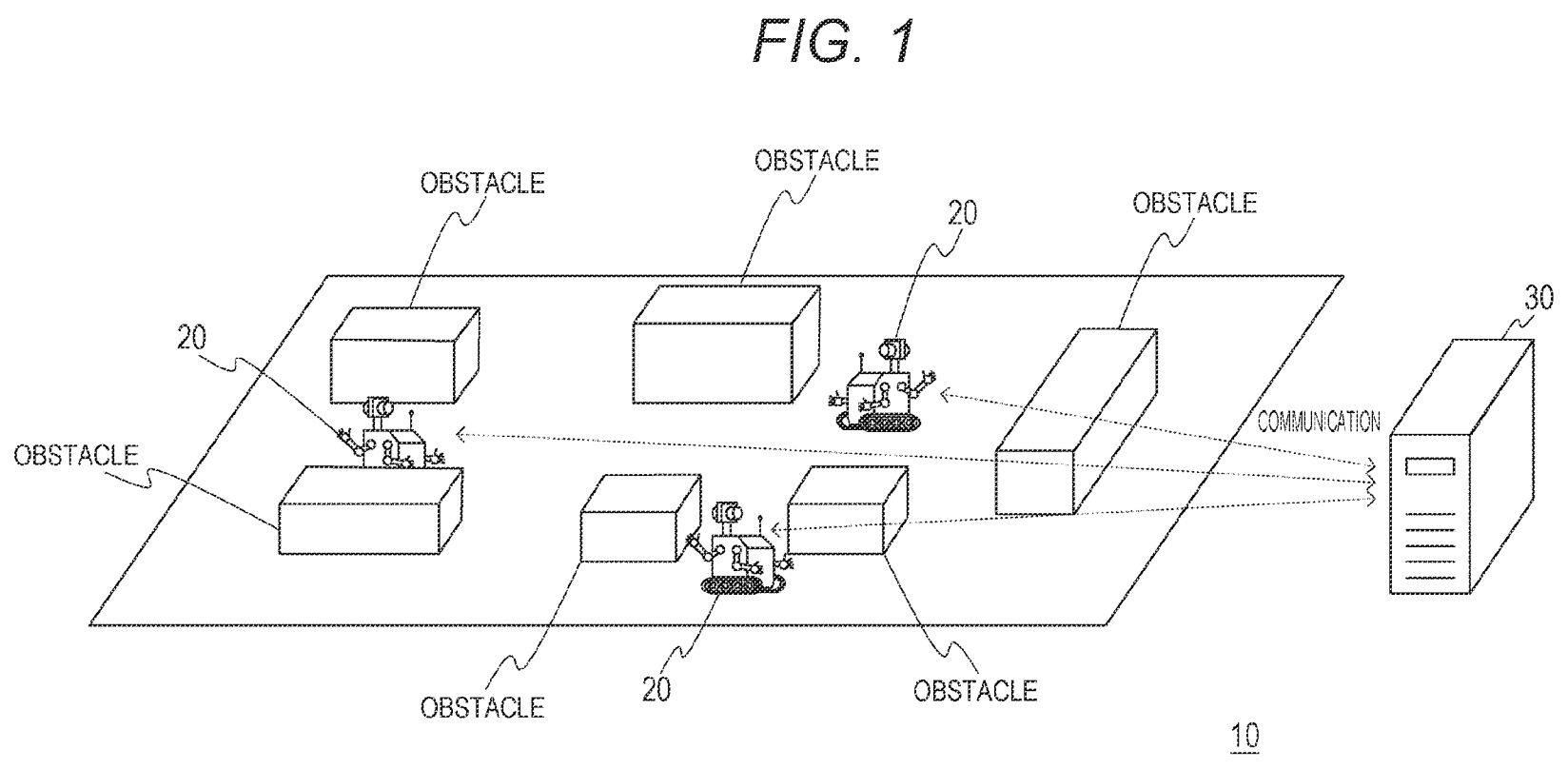

FIG. 1 illustrates a configuration of a mobile body control system. A mobile body control system 10 includes a plurality of mobile bodies 20 and a server 30.

In the mobile body control system 10, a movement task performed using the mobile body 20 is received by the server 30, and the server 30 generates a route plan for executing the movement task and provides the route plan to the mobile body 20. The mobile body 20 plans a path so as to move along a route indicated by the route plan supplied from the server 30 and executes the movement task.

The movement task is a task involving movement of the mobile body 20 such as a robot or an automated guided vehicle (AGV), and the movement task may be performed by an arbitrary mobile body, a mobile body having a predetermined function or capability, a designated mobile body, or the like. Furthermore, the movement task may simply be to reach a certain point and perform a task (such as inspection), or may be to perform further movement to another point (such as conveyance).

The server 30 performs task planning to determine to which mobile body the movement task input from the user or the like is assigned (or whether to change the existing assignment). In the task planning, various methods may be used without particular limitation. For example, in a case where an arbitrary mobile body is used, a method of selecting an empty mobile body closest to the destination of the movement task, a method of selecting a mobile body having the smallest number of assigned tasks in a case where there is no empty mobile body, or the like is used.

When determining the mobile body to which the movement task is assigned, the server 30 generates a route plan on the basis of the route map at that time. The route map is expressed as, for example, a topological map including a relay node group as an intermediate destination candidate in the environment and an edge group connecting relay nodes that is directly passable. In the method using the route map, route planning for determining which relay node or edge the mobile body passes through between the current location and the final destination is initially performed, and the movement to the next node is performed in accordance with a path plan, such that the calculation amount for the path is reduced as compared with a case of calculating the path from the current location to the final destination and performing movement without using the node. A Dijkstra's algorithm or the like is often used as a route planning method. The route plan may be a method of adding a route plan of a target mobile body without changing the route plan of another mobile body, or the entire route plan may be optimized including a review of the route plan of another mobile body.

2. Configurations of Mobile Body and Server

Next, configurations of the mobile body (for example, a trackless automated guided vehicle) and the server will be described. FIG. 2 illustrates configurations of the mobile body and the server.

The mobile body 20 includes a sensor unit 21, a surrounding map generation unit 22, a self-position estimation unit 23, a communication unit 24, a path planning unit 25, a drive control unit 26, and a drive unit 27.

The sensor unit 21 includes an external sensor and an internal sensor. The external sensor of the sensor unit 21 acquires information regarding the surrounding environment of the mobile body (for example, information regarding a surrounding object or the like). As the external sensor, for example, a distance measurement sensor (Light Detection and Ranging, or Laser Imaging Detection and Ranging (LIDAR) sensor, Time Of Flight (TOF), stereo camera, or the like) is used. The external sensor generates sensing data (also referred to as "distance measurement data") indicating a distance to a surrounding object and outputs the sensing data to the surrounding map generation unit 22 and the self-position estimation unit 23. Furthermore, the internal sensor of the sensor unit 21 acquires information regarding the mobile body itself (for example, information indicating the position and orientation of the mobile body, a change thereof, and the like). As the internal sensor, for example, a position sensor, an angle sensor, an acceleration sensor, a gyro sensor, or the like is used. The internal sensor outputs the generated sensing data (also referred to as "internal sensing data") to the self-position estimation unit 23.

The surrounding map generation unit 22 generates map information indicating an object located nearby on the basis of the distance measurement data generated by the sensor unit 21. The surrounding map generation unit 22 outputs the generated map information to the communication unit 24 and the path planning unit 25.

The self-position estimation unit 23 estimates a self-position on the basis of the internal sensing data or internal sensing data generated by the sensor unit 21 and the distance measurement data generated by the external sensor, and outputs self-position information indicating the estimated self-position to the communication unit 24 and the path planning unit 25.

The communication unit 24 is connected to a network and performs wireless communication with the server 30. The wireless communication may include, for example, cellular communication using any of LTE, WCDMA (registered trademark), 5G, and the like, and may include near field communication using any of Wi-Fi, Bluetooth (registered trademark), and the like. The communication unit 24 performs wireless communication with the server 30, and transmits the map information generated by the surrounding map generation unit 22 and the self-position estimated by the self-position estimation unit 23 to the server 30. Note that the communication unit 24 of the mobile body 20 may transmit mobile body information indicating the size, performance, and the like of the mobile body 20 to the server 30. The communication unit 24 receives information transmitted from the server 30, for example, a route plan, and outputs the received information to the path planning unit 25.

The path planning unit 25 plans the path of the mobile body 20 by using map information generated by the surrounding map generation unit 22 and an estimation result of the self-position estimation unit 23 such that the mobile body 20 moves along the route indicated by the route plan supplied from the server 30. In the route plan, as will be described later, the nodes to the destination are sequentially indicated on the basis of a route map indicating a route on which the mobile body can pass and a movement task assigned to the mobile body, and the path planning unit 25 determines a path from the current location to a first node and a path from the current node to the next node. The path planning unit 25 uses, for example, an A* algorithm or a rapidly-exploring random tree (RRT) algorithm as a path-search algorithm to perform recognition of the surrounding environment of the mobile body 20 and a path search for the next node or the destination, and moving operation can be performed while avoiding collision even when there is a dynamic obstacle by repeating determination of an optimum moving speed, angular velocity, and the like at that time. The path planning unit 25 outputs the determined path to the drive control unit 26.

The drive control unit 26 generates a drive signal such that the mobile body 20 moves on the path determined by the path planning unit 25, and outputs the drive signal to the drive unit 27.

The drive unit 27 is configured by using wheels, a drive source (for example, a motor), and the like, and drives the wheels with the drive source on the basis of the drive signal from the drive control unit 26 to move the mobile body 20.

The server 30 includes a communication unit 31, a movable region map generation unit 32, a route map generation unit 33, a map storage unit 34, a mobile body information storage unit 35, a task planning unit 36, and a route planning unit 37.

The communication unit 31 is configured to be capable of performing wireless communication with the communication unit 24 of the mobile body 20. The wireless communication may include cellular communication as described above, or may include near field communication. The communication unit 31 performs wireless communication with the mobile body 20, and receives map information generated by the mobile body 20 and self-position information indicating the estimated self-position. The communication unit 31 outputs the received map information and self-position information to the movable region map generation unit 32. Furthermore, the communication unit 31 receives mobile body information and outputs the mobile body information to the mobile body information storage unit 35. Furthermore, the communication unit 31 transmits the route plan generated by the route planning unit 37 to the mobile body 20.

The movable region map generation unit 32 integrates the map information generated by each mobile body 20 to generate a movable region map indicating a region in which the mobile body 20 can pass in the entire environment. The movable region map generation unit 32 outputs the generated movable region map to the route map generation unit 33. Furthermore, the movable region map generation unit 32 may generate the movable region map on the basis of sensing data acquired by an external sensor provided separately from the mobile body, or may acquire the movable region map generated in advance from an external device or the like. Moreover, the movable region map generation unit 32 updates the movable region map according to a change of the movable region. For example, the movable region map generation unit 32 automatically updates the movable region map when determining that a movable region in which the mobile body 20 can pass has changed due to installation, movement, removal, or the like of an obstacle.

The route map generation unit 33 generates a route map having the number-of-lanes information related to a passage and a passage width on the basis of the movable region map generated by the movable region map generation unit 32. Note that details of generation of the route map will be described later. Furthermore, the route map generation unit 33 automatically updates the route map in a case where it is determined that the movable region has changed by the movable region map generation unit 32 and the movable region map is updated.

The map storage unit 34 stores the route map generated by the route map generation unit 33. Furthermore, the mobile body information storage unit 35 stores mobile body information for each mobile body. The mobile body information may be acquired by communication with the mobile body 20 as described above, or the user may input the mobile body information in advance.

The task planning unit 36 receives a movement task request made by a user or the like, and determines a mobile body that performs a movement task. Moreover, the task planning unit 36 outputs task assignment information indicating the mobile body and the movement task assigned to the mobile body to the route planning unit 37.

The route planning unit 37 generates a route plan for performing the assigned movement task for each mobile body. In the generation of the route plan, a route to the destination is determined on the basis of the passage and number-of-lanes information which are indicated in the route map generated by the route map generation unit 33, and for example, a list sequentially indicating the nodes on a moving route is generated. Furthermore, the route planning unit 37 determines a route such that the movement efficiency of the entire system increases in a case where a movement task is performed by a plurality of the mobile bodies. Moreover, in a case where the route map is updated or in a case where new task assignment information is provided, the route planning unit 37 performs processing of updating the route plan. For example, in a case where the number-of-lanes information of the moving route is updated, or in a case where the moving routes of the mobile body performing newly received movement task overlap, the route planning unit 37 generates a new route plan in consideration of the updated number-of-lanes information, the route of another mobile body, and the like. The route planning unit 37 transmits the route plan generated for each mobile body to the corresponding mobile body 20 via the communication unit 31.

3. Operations of Mobile Body and Server

In an environment in which the obstacles are present, the server sets a boundary line formed by a group of points having an equal distance from obstacles between obstacles in the movable region that is a region in which the mobile body is movable, and determines the number of lanes for the boundary line in accordance with a distance from each of the obstacles and a size of the mobile body moving between the obstacles. Furthermore, the server generates a route map having number-of-lanes information on the basis of the boundary line and the number of lanes determined for the boundary line. For example, the server sets nodes at a branch point and an end point of the boundary line and at a change point of the number of lanes of the boundary line, and automatically generates a topological map in which the nodes are connected by an edge as a route map.

Furthermore, the server selects a mobile body that executes a movement task, sequentially assigns nodes in a traveling direction to the selected mobile body and releases the nodes through which the mobile body passes, and generates a route plan by limiting the number of mobile bodies simultaneously present in accordance with the number of lanes determined by the nodes and edges. Moreover, in a case where the route map is updated, the server generates a route plan again on the basis of the updated route map and the current location of each mobile body. The server transmits the generated route plan to the mobile body. The mobile body plans a path so as to move along a route indicated by the route plan generated by the server and executes the movement task.

<3-1. Regarding Generation of Route Map>

Figure 3:
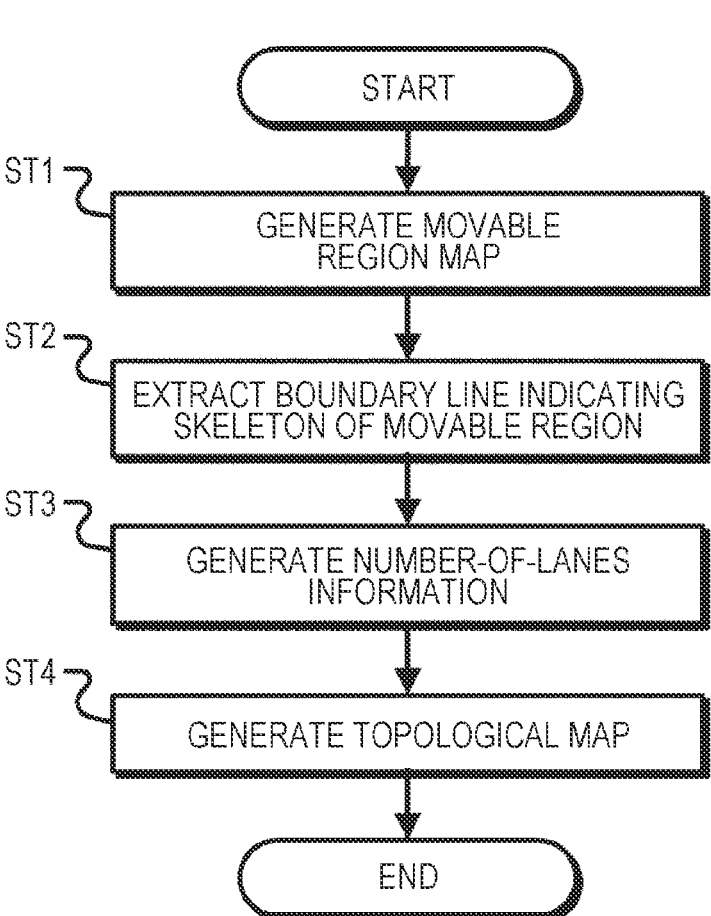
FIG. 3 is a flowchart illustrating operation of generating a route map.

Next, generation of a route map including number-of-lanes information will be described. FIG. 3 is a flowchart illustrating operation of generating the route map.

Figure 4:
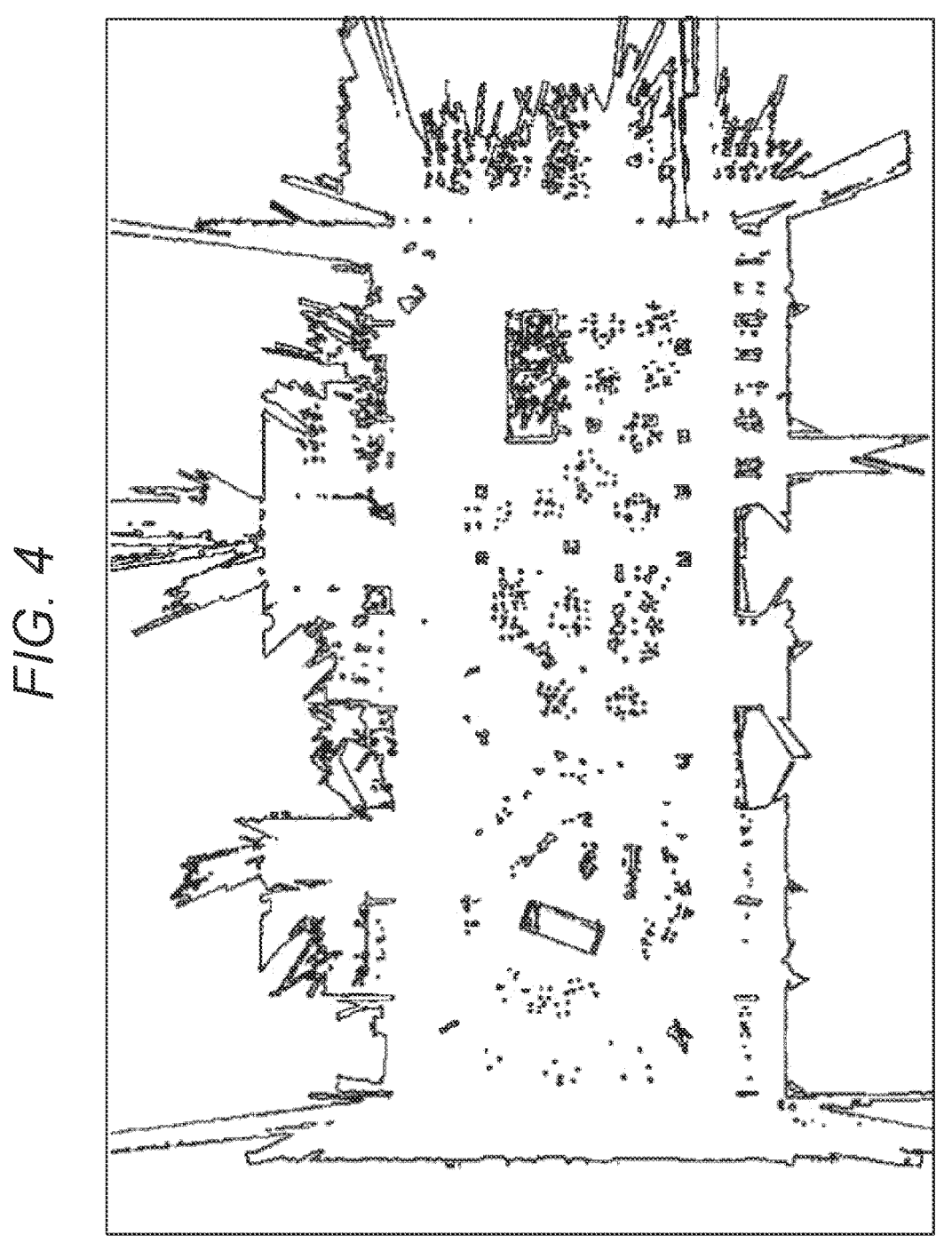

In Step ST1, the movable region map generation unit generates a movable region map. The movable region map generation unit 32 integrates, for example, the map information generated by each mobile body to generate a movable region map indicating a region in which the mobile body can pass in the entire environment, and causes processing to proceed to Step ST2. Note that the movable region map generation unit 32 may generate the movable region map on the basis of sensing data acquired by an external sensor provided separately from the mobile body, or may acquire the movable region map from an external device or the like. Note that FIG. 4 illustrates the movable region map, and detected obstacle is indicated by a line (or dot). The obstacle refers to an object present in the environment, and includes, for example, a mobile body such as a person or an automated mobile robot in addition to a rack, a cardboard box, a desk, and a chair. Furthermore, an object that defines the environment, such as a wall or a column, is also included as the obstacle.

In Step ST2, the route map generation unit extracts a boundary line indicating a skeleton of the movable region. The route map generation unit 33 extracts the boundary line indicating the skeleton of the movable region from the movable region map generated in Step ST1. The boundary line indicating the skeleton is extracted using, for example, a Voronoi region division method. Voronoi region division in two dimensions is a method of dividing a plane into regions on the basis of "which is the closest point" when a plurality of points is disposed in advance on the plane. The route map generation unit 33 performs Voronoi region division on the entire movable region, extracts a boundary line, which is formed by a group of points having a feature that distances to two different obstacles are the same, as a boundary line indicating a skeleton, and causes the processing to proceed to Step ST3. Note that FIG. 5 illustrates a division result of the Voronoi region division, and is a case where the processing of Step ST2 is performed using the movable region map illustrated in FIG. 4.

In Step ST3, the route map generation unit generates number-of-lanes information. The route map generation unit 33 generates, for the boundary line extracted in Step ST2, number-of-lanes information indicating the number of lanes corresponding to the number of mobile bodies that can pass through at the same time. For example, at each point on the boundary line indicating the skeleton, in a case where a distance W to the obstacle is smaller than a value half the size of the mobile body (hereinafter referred to as "size R"), the mobile body cannot pass through. Therefore, the route map generation unit 33 deletes the boundary line through which the mobile body cannot pass. Note that the size of the mobile body is the maximum value of the mobile body width orthogonal to the moving direction. Furthermore, in a case where the mobile body is a trackless automatic guided vehicle (AGV) or the like, the mobile body width is a size including an article to be conveyed. Moreover, the size of the mobile body may include a margin. Note that the mobile body width including the article to be conveyed can be determined by the assigned movement task, and for example, when it is obvious what kind of article is to be conveyed with the movement task, the mobile body width can be calculated on the basis of the article to be conveyed and the shape of the mobile body.

In a case where the boundary lines are separated, the route map generation unit 33 leaves only the boundary line having the longest total distance and deletes the remaining other boundary lines. Moreover, the route map generation unit 33 generates the number-of-lanes information for the remaining boundary lines. For example, in a case where the distance W from the boundary line to the obstacle is equal to or greater than N times the size R and less than (N+1) times the size R, the route map generation unit 33 sets the number-of-lanes information on the boundary line as the number of lanes N. The route map generation unit 33 assigns the generated number-of-lanes information to the boundary line and causes the processing to proceed to Step ST4.

Figure 5:
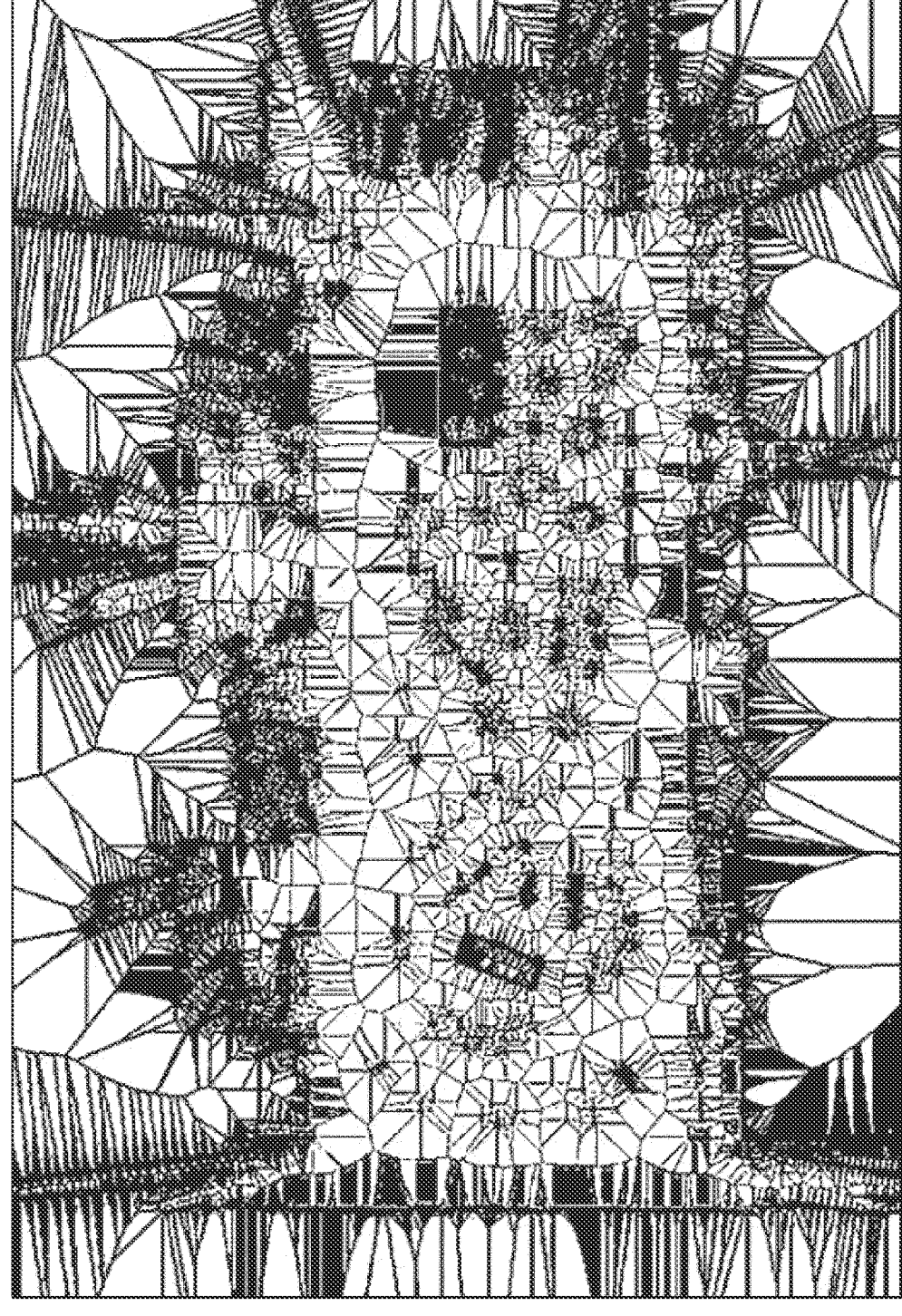
FIG. 5 is a diagram illustrating a division result of Voronoi region division.
Figure 6:
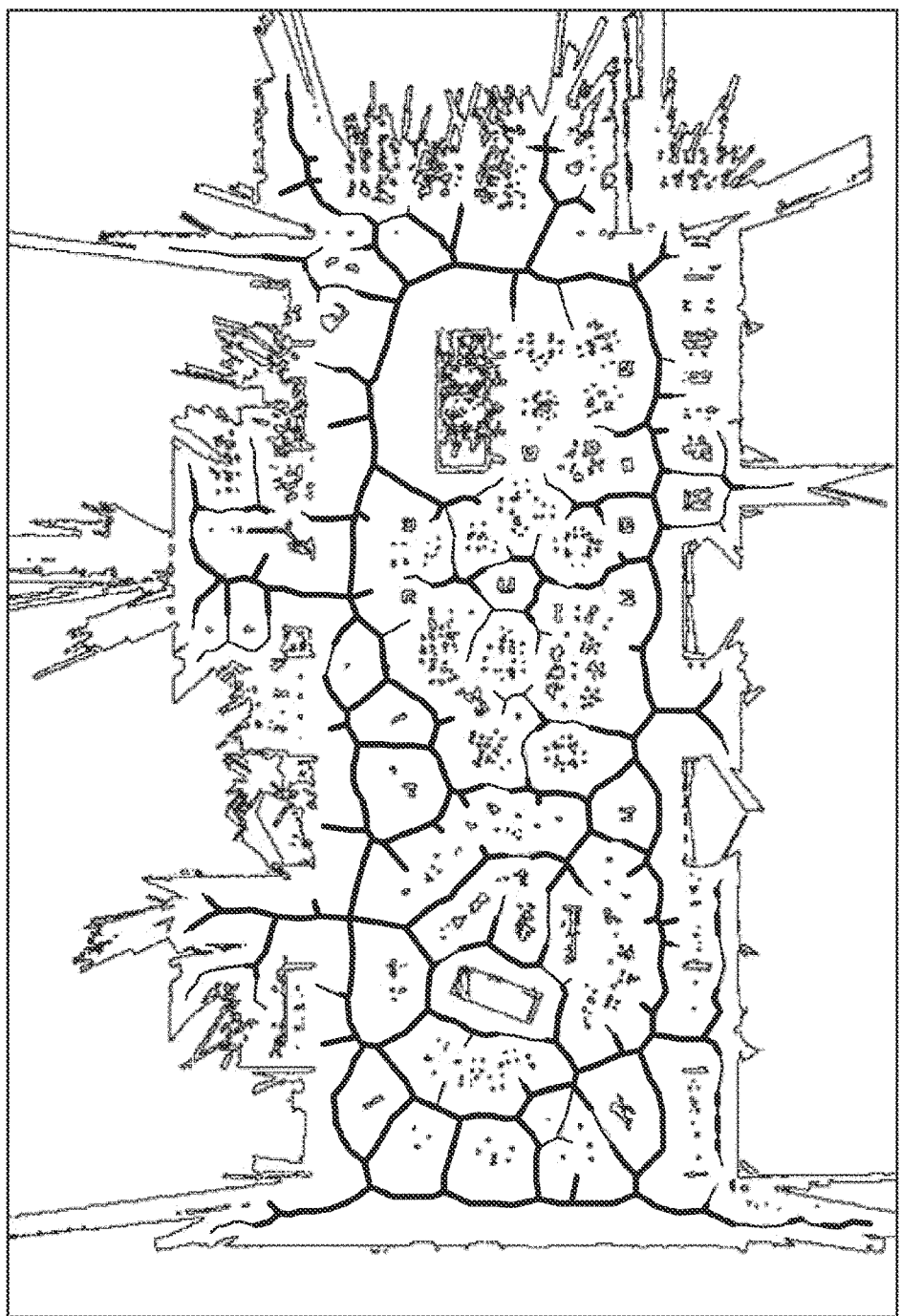
FIG. 6 is a diagram illustrating a boundary line to which number-of-lanes information is assigned.

FIG. 6 illustrates a boundary line to which the number-of-lanes information is assigned, and illustrates a case where the processing of Step ST3 is performed on the division result of the Voronoi region division illustrated in FIG. 5. In FIG. 6, the boundary line indicating the passage through which the mobile body cannot pass is deleted, and in a case where the remaining boundary lines are separated, only the boundary line having the longest total distance is left and the other remaining boundary lines are deleted. Note that in FIG. 6, a boundary line having the number of lanes of "two" is indicated by a thick line, and a boundary line having the number of lanes of "one" is indicated by a thin line.

In Step ST4, the route map generation unit generates a topological map. The route map generation unit 33 assigns nodes to the boundary line to which the number-of-lanes information is assigned, and connects the nodes by the edge to generate the topological map. The route map generation unit 33 performs the following processing on the boundary line to which the number-of-lanes information is assigned to generate the topological map.

Processing 4-1: Nodes are set at an end point, branch point, and change point of the number of lanes of the boundary line.

Processing 4-2: Instead of the boundary line between the nodes, an edge connecting the nodes with a straight line is set.

Figure 7:
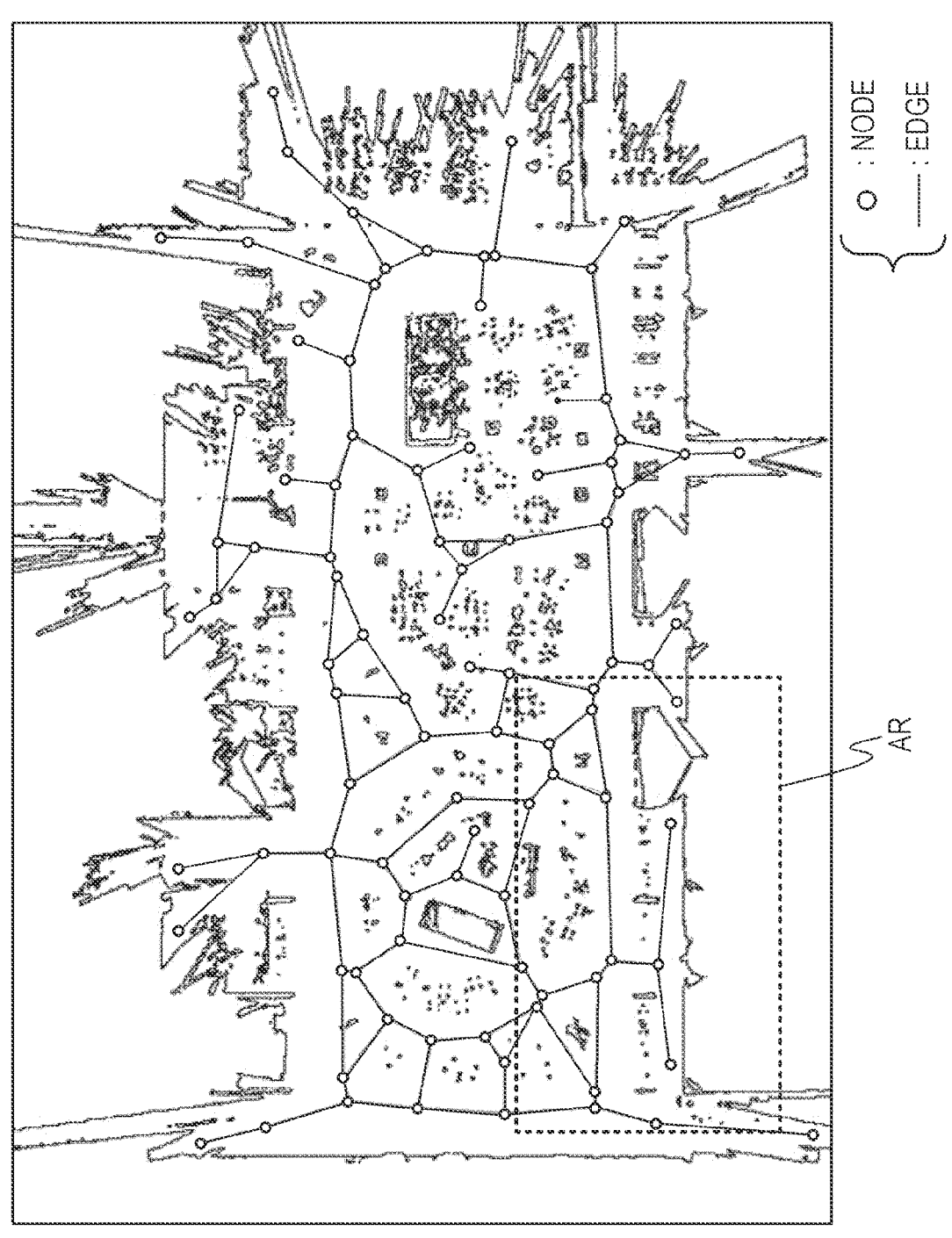
FIG. 7 is a diagram illustrating a processing result in a case where processing 4-1 and processing 4-3 are performed.

FIG. 7 illustrates a processing result obtained in a case where processing 4-1 and processing 4-2 are performed, and illustrates a case where the processing is performed on the boundary line having the number-of-lanes information illustrated in FIG. 6.

Processing 4-3: In a case where the distance between the nodes is shorter than a first threshold Lth1, node combination processing is performed by setting new one node between the nodes instead of two nodes between which a distance is shorter than the first threshold Lth1. Note that the first threshold Lth1 is a distance at which the difference in the moving route of the mobile body is smaller than a predetermined amount even when the two nodes are combined into one.

Processing 4-4: In a case where the maximum separation distance between the edge between the nodes and the boundary line is greater than a separation distance threshold DSth, a node is newly set on the boundary line between the nodes and the edge between the nodes is divided into edges via the newly set node.

Processing 4-5: In a case where an edge length is longer than a second threshold Lth2 (Lth1<Lth2), a node is newly set on the boundary line between the nodes, and an edge between the nodes is divided into edges via the newly set node. Note that the second threshold Lth2 is set to, for example, a value slightly greater than the mobile body width such that the moving route can be finely set.

Figures 8A, 8B:
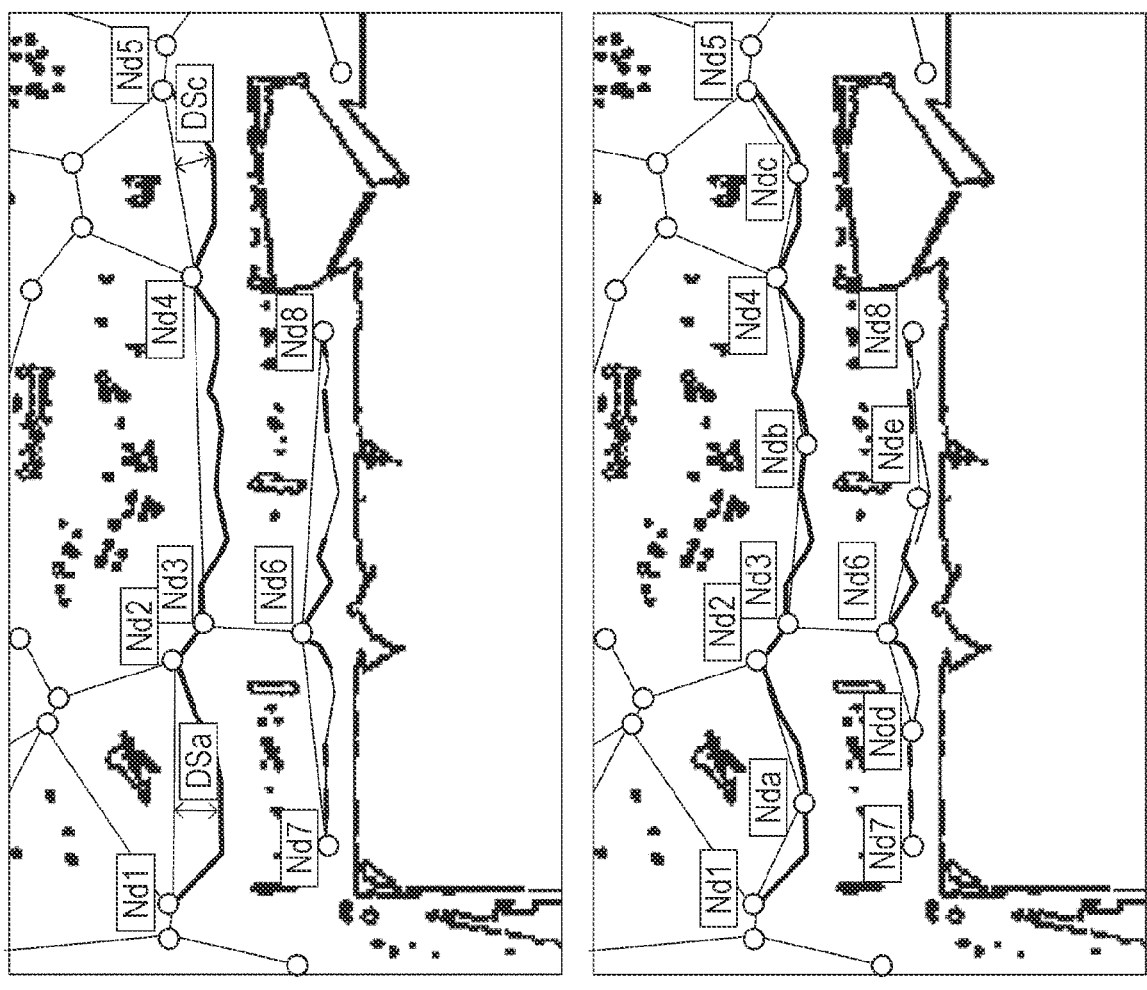
FIGS. 8A and 8B are diagrams for explaining a case where processing 4-4 and processing 4-5 are performed on a region AR.

FIGS. 8A and 8B are diagrams for explaining a case where processing 4-4 and processing 4-5 are performed on a region AR illustrated in FIG. 7. Note that FIG. 8A illustrates a state before processing, and FIG. 8B illustrates a state after processing. For example, in a case where the maximum separation distance between the edge connecting a node Nd1 to a node Nd2 and the boundary line is a distance DSa and is greater than the separation distance threshold DSth, a node Nda is newly set on the boundary line between the node Nd1 and the node Nd2, and then the edge connecting the node Nd1 to the node Nd2 is divided into an edge connecting the node Nd1 to the node Nda and an edge connecting the node Nda to the node Nd2. Furthermore, in a case where the maximum separation distance between the edge connecting a node Nd4 to a node Nd5 and the boundary line is a distance DSc and is greater than the separation distance threshold DSth, a node Ndc is newly set on the boundary line between the node Nd4 and the node Nd5, and then the edge connecting the node Nd4 to the node Nd5 is divided into an edge connecting the node Nd4 to the node Ndc and an edge connecting the node Ndc to the node Nd5.

Furthermore, for example, in a case where the edge connecting a node Nd3 to the node Nd4 is longer than the second threshold Lth2, a node Ndb is newly set on the boundary line between the node Nd3 and the node Nd4, and then the edge connecting the node Nd3 to the node Nd4 is divided into an edge connecting the node Nd3 to the node Ndb and an edge connecting the node Ndb to the node Nd4. Similarly, in a case where the edge connecting a node Nd6 to a node Nd7 and the edge connecting the node Nd6 to a node Nd8 are longer than the second threshold Lth2, nodes Ndd and Nde are newly set on the boundary line between the node Nd6 and the node Nd7 and the boundary line between the node Nd6 and the node Nd8 to perform node division.

Figure 9:
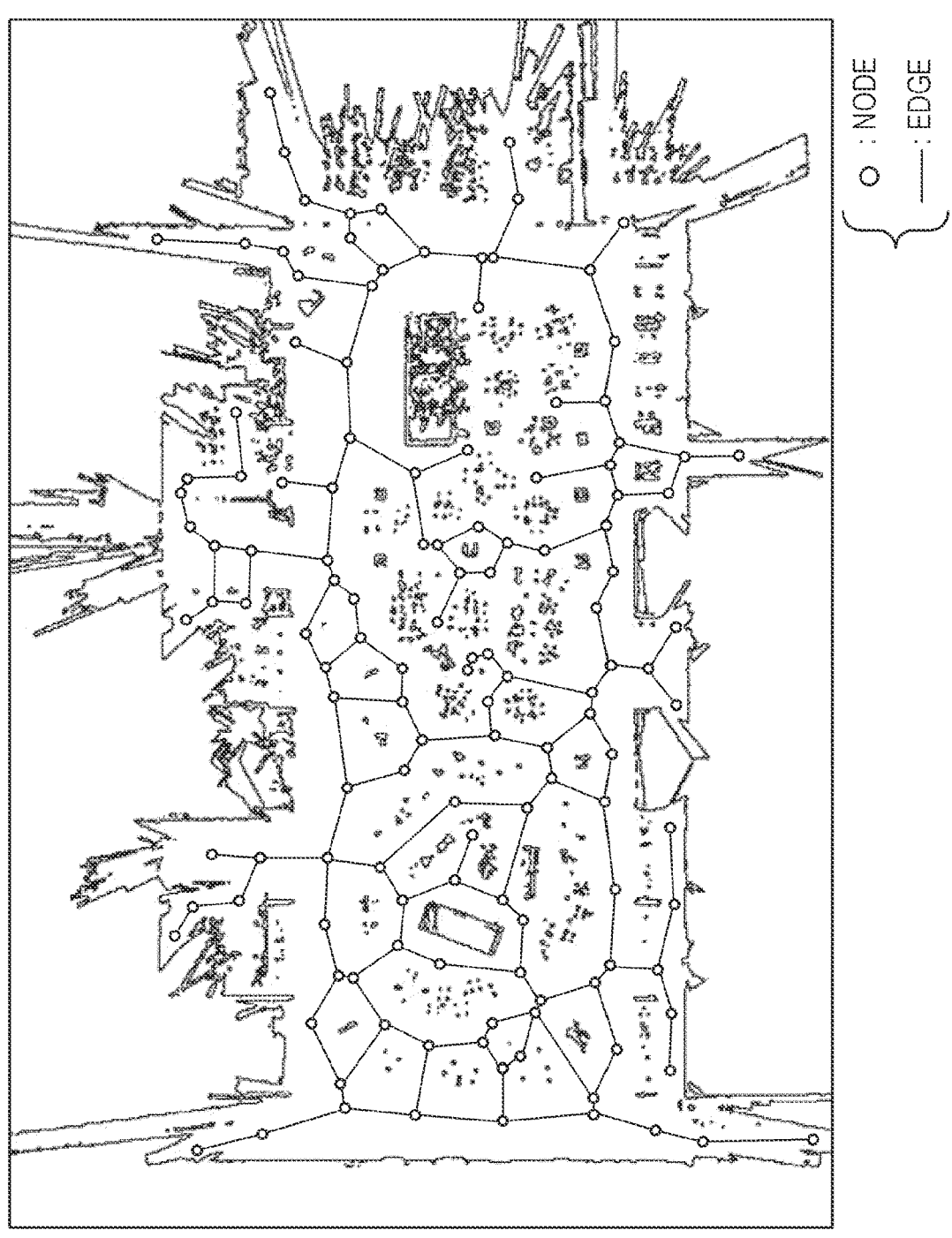
FIG. 9 is a diagram illustrating a processing result in a case where processing 4-4 and processing 4-5 are performed.

Therefore, when processing 4-4 and processing 4-5 are performed on the processing result of FIG. 7, the processing result of FIG. 9 is obtained.

Processing 4-6: Number-of-lanes information of each edge is set to the number of lanes N determined for the boundary line corresponding to the edge.

Processing 4-7: Number-of-lanes information of each node is set to the minimum number of lanes in the edge connected to the nodes.

Figure 10:
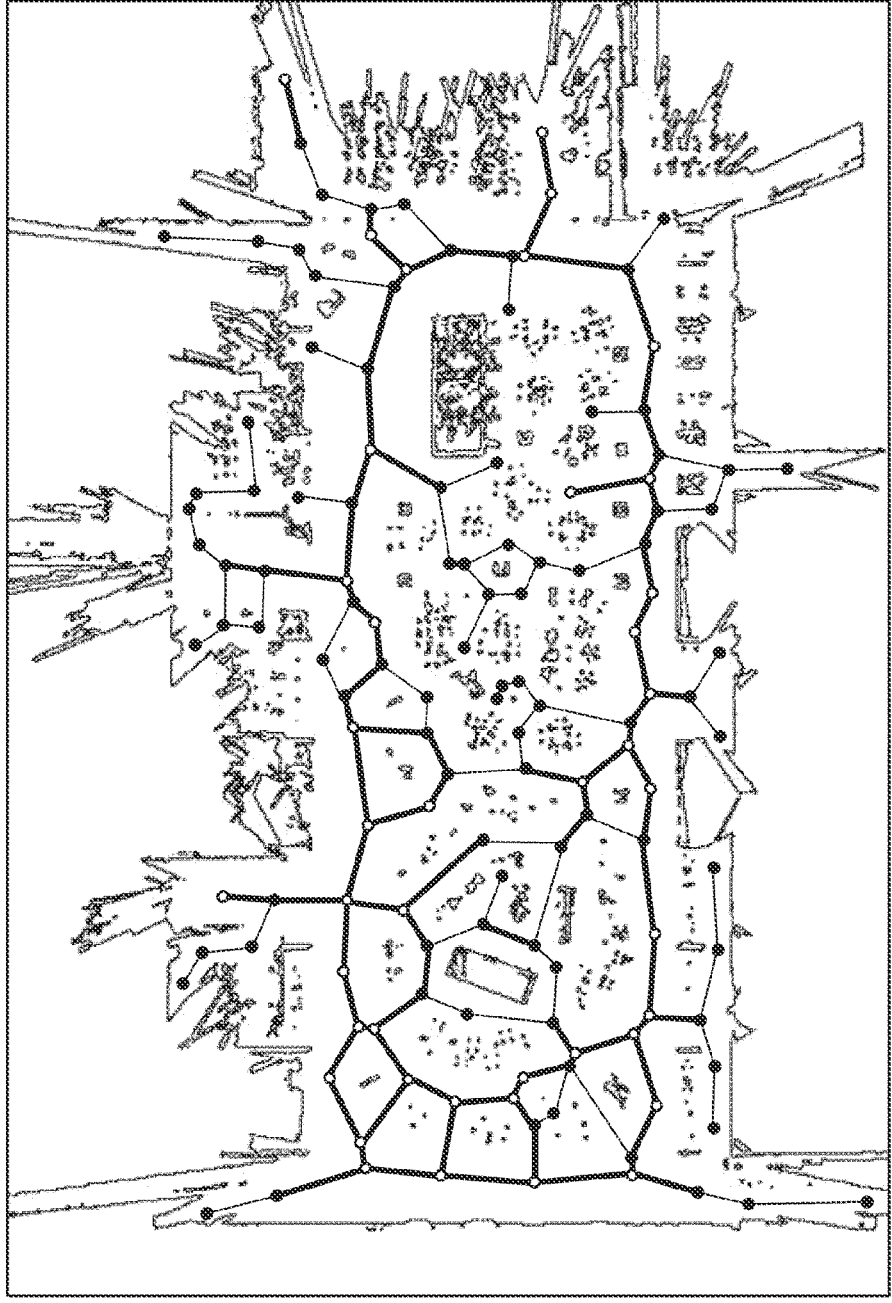
FIG. 10 is a diagram illustrating a processing result in a case where processing 4-6 and processing 4-7 are performed.

FIG. 10 illustrates processing result obtained in a case where processing 4-6 and processing 4-7 are performed on the processing result illustrated in FIG. 9.

The route map generation unit 33 performs processing from Step ST2 to Step ST4 by using the movable region map generated in Step ST1, for example, generates a topological map having the number-of-lanes information illustrated in FIG. 10, and stores the topological map in the map storage unit 34 as a route map.

<3-2. Regarding Generation of Route Plan>

Next, generation of the route plan will be described. As described above, the route map generated by the route map generation unit 33 and stored in the map storage unit 34 is a topological map configured by the nodes and edges, and the edge length is limited to a certain distance or less. Furthermore, in the route map, number-of-lanes information indicating how many mobile bodies can exist at the same time is assigned to each node.

The route planning unit 37 generates a route plan by using the topological map (route map) generated by the route map generation unit 33 by the number of steps in time series. That is, one of time-series topological maps indicates a topological map at a future time, and the mobile body can move to an adjacent node connected by the edge by continuing to move during one step in time series.

In the route plan, topological maps of each time-series step are arranged in time series.

Topological maps are connected by a new edge connecting nodes corresponding to the same position of the original topological map between the adjacent topological maps. In this case, it indicates that the mobile body waits at the same node during one time-series step.

Topological maps are connected by a new edge connecting adjacent nodes connected by the edge of the original topological map. In this case, it indicates that the mobile body moves to the adjacent node during one time-series step.

In this manner, by connecting the topological maps adjacent in a time direction with the edge as described above, it is possible to configure a time-series topological map formed by combining the topological maps in each time-series step.

The route planning unit 37 traces the nodes on the time-series topological map in a form of satisfying a restriction that the mobile body always moves to any node on the topological map of the next time-series step in one time-series step, and generates a path plan in a form that the mobile body reaches the node at a position as the destination. Furthermore, the route planning unit 37 sets a route by limiting the number of moving bodies so as not to exceed the number of lanes indicated by the number-of-lanes information assigned to nodes and edges, and releases the nodes through which the mobile body has passed.

In a case where a route plan of a new mobile body is added, as the simplest method, for example, a node on the time-series topological map that has reached the upper limit of the number of lanes due to the route plan of another mobile body is excluded, and a route satisfying the restriction that the mobile body always moves to any node of the topological map of the next time-series step in one time-series step is selected. For example, when searching a route by using a Dijkstra's algorithm, the route planning unit 37 limits only a route satisfying the above-described restriction as a search target.

Furthermore, as another method for adding a route plan of a new mobile body, route planning for all the mobile bodies may be collectively performed again. Specifically, a route plan is selected by full search or the like, the route plan satisfying a restriction condition that the "mobile body always moves to any node of the topological map of the next time-series step in one time-series step" and a restriction that the "mobile bodies corresponding to the number of lanes or more should not exist on a node of a certain time-series topological map". For example, the route planning unit 37 uses a method described in the document "Optimal Multi-Robot Path Planning on Graphs: Complete Algorithms and Effective Heuristics, Jingjin Yu Steven M. LaValle, 2015".

The route planning unit 37 transmits the generated route plan for each mobile body to the corresponding mobile body, and the mobile body performs movement control on the basis of the route plan generated by the route planning unit 37 and completes the movement task.

As described above, when the route map having number-of-lanes information is generated, even in an environment in which the layout of the obstacle dynamically changes and the passable region of the mobile body changes, the route plan is generated on the basis of the route map having the number-of-lanes information, such that the movement task can be processed without causing a stall or the like even when many mobile bodies are used. Furthermore, not only the route map having the number-of-lanes information is generated, but also the route map is automatically updated in accordance with a change of the movable region. Therefore, it is not necessary to manually reset the route map in accordance with a change of the layout of the obstacle, and efficient operation can be easily performed at low cost.

<3-3. Regarding Modification Example of Generation of Route Map and Route Plan>

By the way, in a case where a plurality of mobile bodies is used, a mobile body having a different shape may be used. In this case, mobile body information of the mobile body having a different shape is stored in the mobile body information storage unit 35, a base lane width is determined from the width of the mobile body having a different shape, and the number of lanes is calculated using the basic lane width. Moreover, in route planning, the route of the mobile body is planned on the basis of the number of lanes occupied by the mobile bodies having different shapes. In this case, the number of lanes corresponds to the number of moving bodies that can pass through at the same time, but does not always indicate the number of mobile bodies that can pass through, and the number of lanes calculated using the base lane width is used as the number for enabling calculation of the number of mobile bodies that can pass through at the same time as described later.

Next, a case where, for example, three types of mobile bodies MOa, MOb, and MOc are used in the mobile body control system 10 will be described. The width of the mobile body MOa is a mobile body width MWa, the width of the mobile body MOb is a mobile body width MWb, and the width of the mobile body MOc is a mobile body width MWc. The margin required at the time of movement of the mobile body MOa is a width ma, the margin required at the time of movement of the mobile body MOb is a width mb, and the margin required at the time of movement of the mobile body MOc is a width mc. Note that the mobile body width is a size including the size of the article to be conveyed as described above. In this case, a width (MWa+ma) is occupied when the mobile body MOa moves. Similarly, a width (MWb+mb) is occupied when the mobile body MOb moves, and a width (MWc+mc) is occupied when the mobile body MOc moves. Therefore, a base lane width BW satisfying Equations (1), (2), and (3) is calculated. Note that the numbers of occupied lanes Ka, Kb, and Kc are natural numbers, and the widths ma, mb, and mc of the margin are values smaller than the base lane width BW.

$$MWa+ma=Ka \times BW \tag{1}$$

$$MWb+mb=Kb \times BW \tag{2}$$

$$MWc+mc=Kc \times BW \tag{3}$$

For example, in a case where width (MWa+ma)=40 cm, width (MWb+mb)=60 cm, and width (MWc+mc)=100 cm, 20 cm which is the greatest common divisor of each width is set as the base lane width BW. In this case, two lines (Ka=2) are occupied in the movement of the mobile body MOa, three lines (Kb=3) are occupied in the movement of the mobile body MOb, and five lines (Kc=5) are occupied in the movement of the mobile body MOc.

In a case where the mobile body having a different shape is used, the route map generation unit 33 calculates the number of lanes of each node on the basis of the base lane width BW determined on the basis of the mobile body information for each mobile body, which is stored in the mobile body information storage unit 35. Specifically, in Step ST3 of FIG. 3, the number of lanes N is calculated with a size half the base lane width BW as the size R.

In a case where the mobile body having a different shape is used, the route planning unit 37 sets the number of occupied lanes for each mobile body and generates a route plan such that the total number of occupied lanes at each node does not exceed the number of lanes at any timing.

Specifically, as described above, the base lane width BW is 20 cm, the number of occupied lanes of the mobile body MOa is two lines (Ka=2), the number of occupied lanes of the mobile body MOb is three lines (Kb=3), and the number of occupied lanes of the mobile body MOc is five lines. In this case, in the node having six lanes, three mobile bodies MOa (the total number of occupied lanes=2×3 lines), two mobile bodies MOb (the total number of occupied lanes=3×2 lines), one mobile body MOc (the total number of occupied lanes=1×5 lines), or one mobile body MOa and one mobile body MOb (the total number of occupied lanes=2+3 lines) can be present. However, the mobile body MOc and the other mobile bodies MOa and MOb cannot be present at the same time (the total number of occupied lanes >6 lines). Therefore, the route planning unit 37 sets a route on the basis of the number of occupied lanes for each mobile body so as not to exceed the number of lanes of the node. For example, in a case where route planning for the mobile body MOb is newly performed, when the number of occupied lanes of the mobile body MOb is three lines, a route is searched while excluding nodes having two or less empty lanes, and a route plan is generated.

<3-4. Regarding Use of Lane Map>

By the way, in the above-described embodiment, a case where the topological map in which the number-of-lanes information is assigned to the nodes and the edges is generated as the route map has been described. However, it is also possible to generate a route plan by providing the same number of edges as the number of lanes to set the nodes at opposite ends, and using the lane map in which the number of lanes of the nodes and the edges is one as the route map.

In the generation of the lane map, the following processing is performed.

Processing 5-1: New N nodes (hereinafter referred to as "way point (WP)") are generated in the vicinity of opposite end nodes of the edge having the number of lanes N, and the number of lanes is set to "one" by connecting the WPs with the edge.

Processing 5-2: WPs are connected in mesh by edges (connected by edges in a round-robin manner) and the number of lanes is set to "one".

Figures 11A, 11B:
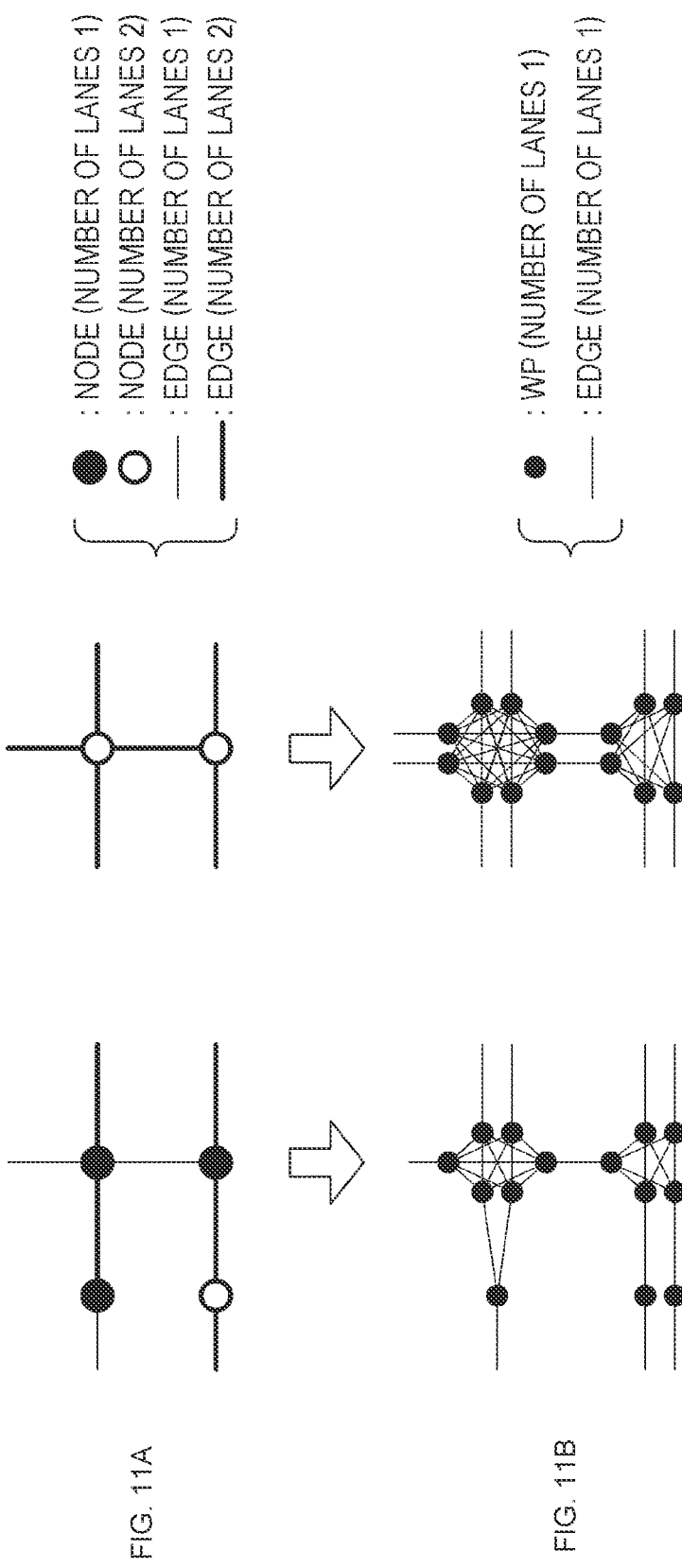
FIGS. 11A and 11B are diagrams for explaining generation of a lane map.

FIGS. 11A and 11B are diagrams for explaining generation of a lane map, in which FIG. 11A illustrates a topological map in which number-of-lanes information is assigned to nodes and edges, and FIG. 11B illustrates a lane map corresponding to the topological map. When processing 5-1 and processing 5-2 are performed on the topological map in which the number-of-lanes information is assigned to the node and the edge, a lane map in which the number of lanes of the WP and the edge is "one" can be generated.

Figure 12:
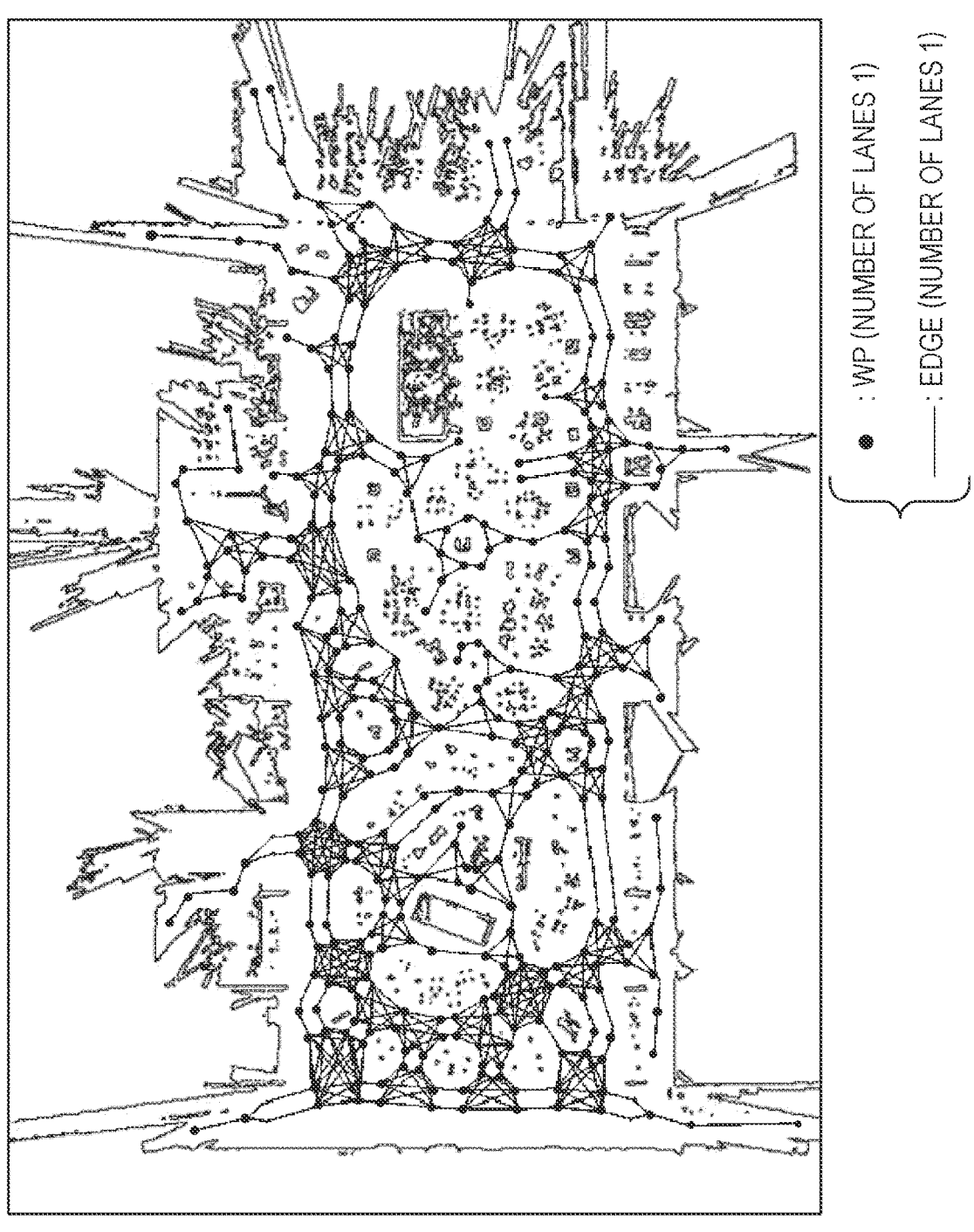
FIG. 12 is a diagram illustrating a lane map.

FIG. 12 illustrates the lane map generated using the route map illustrated in FIG. 10. In the number-of-lanes information of the route map, one edge is provided for a passage in which the number of lanes is "one", and two edges are provided for a passage in which the number of lanes is "two".

The route planning unit 37 plans a route by using the lane map in a similar manner to the case of using the route map including the number-of-lanes information.

In a case where the route planning unit 37 generates a route plan on the basis of the route map (in a case where the lane map is not used), since a route is determined such that N or less mobile bodies can pass through a node having the number of lanes N, it is guaranteed that there is a space required for parallel running of N or less mobile bodies or for passing of N or less mobile bodies with each other. However, in actual parallel running or passing with each other, it is necessary to perform control such that contact or collision does not occur due to the path plan of the mobile body. For example, in the case of passing with each other, when the mobile body detects the presence of another mobile body while passing through the center of the passage, the mobile body needs to perform a collision avoidance operation by deceleration or a direction change, which causes a decrease in a moving speed or the like.

However, in a case of generating a route plan on the basis of the lane map, the route planning unit 37 can designate a lane on which each mobile body passes such that parallel running or passing with each other is possible. Therefore, the mobile body is less likely to perform deceleration operation or avoidance operation so as not to cause contact or collision due to the path plan, and the moving speed is less decreased as compared with the route plan not using the lane map, and the movement task can be efficiently processed.

4. Application Example

The technology according to the present disclosure can be applied to various fields. For example, the technology according to the present disclosure may be realized as a device mounted on any type of mobile body such as an automobile, an electric vehicle, a hybrid electric vehicle, a motorcycle, a bicycle, a personal mobility, a ship, and a robot. Furthermore, the technology according to the present disclosure may be realized as a device mounted on an equipment used in a production process in a factory, an equipment used in a construction field, or an equipment used in agriculture, forestry, or the like. When the technology according to the present disclosure is applied to such a field, work or the like can be efficiently performed using a plurality of equipments even in an environment in which a passable region of a mobile body changes according to a work situation.

A series of processing described in the specification can be executed by hardware, software, or a combined configuration of both the software and the hardware. In a case where processing is executed by software, a program in which a processing sequence is recorded is installed and executed in a memory in a computer incorporated in dedicated hardware. Alternatively, the program can be installed and executed in a general-purpose computer capable of executing various types of processing.

For example, the program can be recorded in advance in a hard disk, a solid state drive (SSD), or a read only memory (ROM) as a recording medium. Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (BD) (registered trademark), a magnetic disk, or a semiconductor memory card. Such a removable storage medium can be provided as so-called package software.

Furthermore, in addition to installing the program from the removable recording medium to the computer, the program may be transferred from a download site to the computer wirelessly or by wire via a network such as a local area network (LAN) or the Internet. In the computer, the program transferred as described above can be received and installed in a recording medium such as a built-in hard disk.

Note that the effects described in the present specification are merely examples and are not limited, and additional effects not described may be provided. Furthermore, the present technology should not be construed as being limited to the embodiment of the technology described above. The embodiment of the technology disclose the present technology in the form of exemplification, and it is obvious that those skilled in the art can make a modification and substitution of the embodiment without departing from the gist of the present technology. That is, in order to determine the gist of the present technology, the claims should be taken into consideration.

Furthermore, the information processing device of the present technology can also have the following configurations.

(1) An information processing device including a route map generation unit configured to, in an environment in which obstacles are present, set a boundary line formed by a group of points having an equal distance from two different obstacles among the obstacles between the obstacles in a movable region that is a region in which a mobile body is movable, and determine the number of lanes for the boundary line in accordance with a distance from each of the obstacles to the boundary line and a size of the mobile body moving in the environment.

(2) The information processing device according to (1), in which the number of lanes corresponds to the number of mobile bodies that is capable of passing through at the same time.

(3) The information processing device according to (1) or (2), in which the route map generation unit performs Voronoi region division on the movable region and sets the boundary line.

(4) The information processing device according to any one of (1) to (3), in which the size of the mobile body is a maximum value of a mobile body width orthogonal to a moving direction.

(5) The information processing device according to any one of (1) to (4), in which the size of the mobile body includes a margin.

(6) The information processing device according to any one of (1) to (5), in which the route map generation unit generates a route map including number-of-lanes information on the basis of the boundary line and the number of lanes determined for the boundary line.

(7) The information processing device according to any one of (1) to (6), in which the route map generation unit sets a node at a branch point and an end point of the boundary line and at a change point of the number of lanes of the boundary line, and generates a topological map in which the nodes are connected by an edge as the route map.

(8) The information processing device according to (7), in which in a case where a distance between the nodes is shorter than a first threshold, the route map generation unit sets new one node between the nodes instead of two nodes between which a distance is shorter than the first threshold.

(9) The information processing device according to (7) or (8), in which in a case where a maximum separation distance between the edge between the nodes and the boundary line is greater than a separation distance threshold, the route map generation unit newly sets a node on the boundary line between the nodes and divides the edge between the nodes into edges via the newly set node.

(10) The information processing device according to (8) or (9), in which in a case where the distance between the nodes is longer than a second threshold longer than the first threshold, the route map generation unit newly sets a node on the boundary line between the nodes and divides the edge between the nodes into edges via the newly set node.

(11) The information processing device according to any one of (7) to (10), in which the route map generation unit sets the number of lanes determined for the boundary line as number-of-lanes information of the edge corresponding to the boundary line.

(12) The information processing device according to any one of (7) to (11), in which the route map generation unit sets the minimum number of lanes in the edge connected to the node as number-of-lanes information of the node.

(13) The information processing device according to any one of (7) to (10), in which the route map generation unit provides the same number of edges as the number of lanes determined for the boundary line and sets nodes at opposite ends of the edge to generate, as the route map, a lane map in which the number of lanes of the node and the edge is one.

(14) The information processing device according to any one of (6) to (13), in which the route map generation unit updates the route map in accordance with a change of the movable region.

(15) The information processing device according to any one of (6) to (14), further including a route planning unit configured to plan a route of the mobile body by using the route map including the number-of-lanes information.

(16) The information processing device according to (15), in which the route planning unit plans a route for each mobile body such that the number of mobile bodies does not exceed the number of lanes indicated by the number-of-lanes information.

(17) The information processing device according to (15) or (16), in which the route map generation unit determines the number of lanes by using a base lane width corresponding to the mobile bodies having a plurality of different sizes as the size of the mobile body, and the route planning unit plans the route by using the number of lanes having the base lane width occupied by each mobile body having a plurality of the different sizes.

REFERENCE SIGNS LIST

10 Mobile body control system
20 Mobile body
21 Sensor unit
22 Surrounding map generation unit
23 Self-position estimation unit
24, 31 Communication unit
25 Path planning unit
26 Drive control unit

27 Drive unit
30 Server
32 Movable region map generation unit
33 Route map generation unit
34 Map storage unit
35 Mobile body information storage unit
36 Task planning unit
37 Route planning unit

The invention claimed is:

1. An information processing device, comprising:
circuitry configured to:
  set a boundary line in an environment with a plurality of obstacles, wherein
    the boundary line corresponds to a group of points, each of the group of points is equidistant from a first obstacle of the plurality of obstacles and a second obstacle of the plurality of obstacles,
    the first obstacle is different from the second obstacle,
    the first obstacle is adjacent to the second obstacle,
    the boundary line is in a movable region,
    the movable region is between the first obstacle and the second obstacle, and
    a mobile body of a plurality of mobile bodies is movable in the movable region;
  determine a number of lanes for the boundary line based on a first distance from the first obstacle to the boundary line, a second distance from the second obstacle to the boundary line, and a size of the mobile body, wherein the determined number of lanes of the boundary line corresponds to a number of the plurality of mobile bodies that are capable to pass through the movable region at a specific time;
  generate a route map to navigate the mobile body in the environment based on the boundary line and the determined number of lanes of the boundary line; and
  automatically update the route map based on a change of the movable region.

2. The information processing device according to claim 1, wherein the circuitry is further configured to:
  perform Voronoi region division on the movable region; and
  set the boundary line based on the Voronoi region division on the movable region.

3. The information processing device according to claim 1, wherein
  the size of the mobile body is equal to a mobile body width, and
  the mobile body width is orthogonal to a moving direction.

4. The information processing device according to claim 1, wherein the size of the mobile body includes a margin.

5. The information processing device according to claim 1, wherein the route map includes number-of-lanes information of the boundary line.

6. The information processing device according to claim 5, wherein the circuitry is further configured to plan a route of the mobile body based on the route map.

7. The information processing device according to claim 6, wherein the circuitry is further configured to plan the route for each mobile body of the plurality of mobile bodies, wherein
  the number of the plurality of mobile bodies are less than the determined number of lanes of the boundary line, and the number-of-lanes information of the boundary line corresponds to the number of lanes of the boundary line.

8. The information processing device according to claim 6, wherein the circuitry is further configured to:
  determine the number of lanes of the boundary line based on a base lane width that corresponds to the plurality of mobile bodies, wherein the plurality of mobile bodies has a plurality of sizes; and
  plan the route based on the determined number of lanes of the boundary line, wherein each of the number of lanes of the boundary line has the base lane width.

9. The information processing device according to claim 1, wherein the circuitry is further configured to:
  set a first node of a plurality of nodes at a branch point of the boundary line, at an end point of the boundary line, and at a change point of the determined number of lanes of the boundary line; and
  generate a topological map as the route map, wherein
    in the topological map, the plurality of nodes is connected to a plurality of edges of the route map.

10. The information processing device according to claim 9, wherein the circuitry is further configured to set, based on a third distance is shorter than a first threshold value, a specific node between a second node of the plurality of nodes and a third node of the plurality of nodes, wherein
  the third distance is between the second node and the third node, and
  the third node is different from the second node.

11. The information processing device according to claim 10, wherein the circuitry is further configured to:
  set, based on the third distance is greater than a second threshold value, the specific node on the boundary line, wherein the second threshold value is greater than the first threshold value; and
  divide a first edge of the plurality of edges into a second edge and a third edge through the set specific node, wherein
    the first edge is between the second node and the third node, and
    the plurality of edges includes the second edge and the third edge.

12. The information processing device according to claim 9, wherein the circuitry is further configured to:
  set, based on a separation distance is greater than a separation distance threshold value, a specific node on the boundary line, wherein
    the specific node is between a second node of the plurality of nodes and a third node of the plurality of nodes,
    the separation distance is between a first edge of the plurality of edges and the boundary line, and
    the first edge is between the second node and the third node; and
  divide the first edge into a second edge and a third edge through the set specific node, wherein
    the third node is different from the second node, and
    the plurality of edges includes the second edge and the third edge.

13. The information processing device according to claim 9, wherein
  the circuitry is further configured to set number-of-lanes information of an edge of the plurality of edges as the determined number of lanes, and
  the edge corresponds to the boundary line.

14. The information processing device according to claim 9, wherein
the circuitry is further configured to set number-of-lanes information of the first node as a number of lanes in an edge of the plurality of edges, and
the edge is connected to the first node.
15. The information processing device according to claim 9, wherein the circuitry is further configured to:
set a number of the plurality of edges equal to the determined number of lanes of the boundary line;
set a second node of the plurality of nodes and a third node of the plurality of nodes at opposite ends of each edge of the plurality of edges, wherein the second node is different from the third node; and
generate, as the route map, a lane map based on the set second node and the set third node, wherein each of a number of lanes of the set second node, a number of lanes of the set third node, and a number of lanes of the plurality of edges is one.
16. An information processing method, comprising:
setting a boundary line in an environment with a plurality of obstacles, wherein
the boundary line corresponds to a group of points,
each of the group of points is equidistant from a first obstacle of the plurality of obstacles and a second obstacle of the plurality of obstacles,
the first obstacle is different from the second obstacle,
the first obstacle is adjacent to the second obstacle,
the boundary line is in a movable region,
the movable region is between the first obstacle and the second obstacle, and
a mobile body of a plurality of mobile bodies is movable in the movable region;
determining a number of lanes for the boundary line based on a first distance from the first obstacle to the boundary line, a second distance from the second obstacle to the boundary line, and a size of the mobile body, wherein the determined number of lanes of the boundary line corresponds to a number of the plurality of mobile bodies that are capable to pass through the movable region at a specific time;
generating a route map to navigate the mobile body in the environment based on the boundary line and the determined number of lanes of the boundary line; and

automatically updating the route map based on a change in the movable region.
17. The information processing method according to claim 16, wherein
the route map includes number-of-lanes information of the boundary line, and
the number-of-lanes information is based on the determined number of lanes of the boundary line.
18. A non-transitory computer-readable medium having stored thereon computer-executable instructions that, when executed by a computer, cause the computer to execute operations, the operations comprising:
setting a boundary line in an environment with a plurality of obstacles, wherein
the boundary line corresponds to a group of points,
each of the group of points is equidistant from a first obstacle of the plurality of obstacles and a second obstacle of the plurality of obstacles,
the first obstacle is different from the second obstacle,
the first obstacle is adjacent to the second obstacle,
the boundary line is in a movable region,
the movable region is between the first obstacle and the second obstacle, and
a mobile body of a plurality of mobile bodies is movable in the movable region;
determining a number of lanes for the boundary line based on a first distance from the first obstacle to the boundary line, a second distance from the second obstacle to the boundary line, and a size of the mobile body, wherein the determined number of lanes of the boundary line corresponds to a number of the plurality of mobile bodies that are capable to pass through the movable region at a specific time;
generating a route map to navigate the mobile body in the environment based on the boundary line and the determined number of lanes; and
automatically updating the route map based on a change in the movable region, wherein
the route map includes number-of-lanes information, and
the number-of-lanes information corresponds to the determined number of lanes of the boundary line.

* * * * *